US006689998B1

(12) United States Patent
Bremer

(10) Patent No.: US 6,689,998 B1
(45) Date of Patent: Feb. 10, 2004

(54) APPARATUS FOR OPTICAL DISTANCING AUTOFOCUS AND IMAGING AND METHOD OF USING THE SAME

(75) Inventor: Edward C. Bremer, Rochester, NY (US)

(73) Assignee: PSC Scanning, Inc., Eugene, OR (US)

( * ) Notice: Subject to any disclaimer, the term of this patent is extended or adjusted under 35 U.S.C. 154(b) by 12 days.

(21) Appl. No.: 09/610,232

(22) Filed: Jul. 5, 2000

(51) Int. Cl.[7] ................................................ G02B 7/04
(52) U.S. Cl. ............................ 250/201.2; 235/462.23; 250/208.1
(58) Field of Search .......................... 250/201.2, 208.1, 250/201.5, 234, 235; 396/79, 80, 120, 121; 235/462.22, 462.23, 462.24

(56) References Cited

U.S. PATENT DOCUMENTS

| | | | |
|---|---|---|---|
| 3,963,347 A | 6/1976 | Segre et al. | |
| 4,136,821 A | 1/1979 | Sugiura et al. | |
| 4,333,716 A | 6/1982 | Sakane et al. | ................ 354/25 |
| 4,490,036 A | 12/1984 | Anagnostopoulos | |
| 4,542,528 A | 9/1985 | Sanner et al. | |
| 4,673,274 A | 6/1987 | Nagaoka et al. | |
| 4,687,914 A | 8/1987 | Tsunekawa et al. | |
| 4,818,886 A | 4/1989 | Drucker | |
| 4,825,091 A * | 4/1989 | Breyer et al. | .......... 250/559.38 |
| 4,877,949 A * | 10/1989 | Danielson et al. | ..... 235/462.21 |
| 5,105,392 A * | 4/1992 | Stringer et al. | ................ 367/99 |
| 5,231,443 A | 7/1993 | Subbarao | .................... 354/400 |
| 5,262,838 A | 11/1993 | Tocher | |
| 5,341,186 A | 8/1994 | Kato | |
| 5,442,167 A * | 8/1995 | Cornelius et al. | ........ 250/201.2 |
| 5,445,369 A | 8/1995 | Golicz et al. | |
| 5,541,400 A * | 7/1996 | Hagiwara et al. | ........ 250/208.1 |
| 5,627,366 A | 5/1997 | Katz | |
| 5,691,834 A | 11/1997 | Plesko | |
| 5,717,194 A | 2/1998 | Forbes et al. | |
| 5,719,678 A | 2/1998 | Reynolds et al. | ........... 356/379 |
| 5,770,847 A | 6/1998 | Olmstead | |
| 5,778,261 A | 7/1998 | Tanaka et al. | |
| 5,796,089 A | 8/1998 | Marom | ........................ 235/472 |
| 5,804,809 A | 9/1998 | Eastman et al. | |
| 5,805,275 A | 9/1998 | Taylor | |

(List continued on next page.)

FOREIGN PATENT DOCUMENTS

| | | | |
|---|---|---|---|
| EP | 0 620 680 A1 | 10/1993 | .......... H04N/5/232 |
| EP | 0 766 101 A2 | 4/1997 | |
| EP | 796 671 A1 | 9/1997 | ............. B07C/3/14 |
| EP | 0 984 319 A1 | 3/2000 | ............. G03B/5/08 |
| EP | 0984319 * | 3/2000 | ............. G03B/5/08 |
| JP | 54083424 | 3/1979 | ............. G02B/7/11 |
| JP | 84119929 | 12/1985 | |
| JP | 94125157 | 12/1995 | |
| WO | WO 96/38708 | 12/1996 | .......... G01B/11/06 |
| WO | WO 96/42064 | 12/1996 | |
| WO | WO 00/04487 | 1/2000 | |

OTHER PUBLICATIONS

Young, Matt, Optics and Lasers including Fibers and optical Waveguide, 1986, Spring–Verlag, 3rd Ed., pp. 8–9.*
Young, Matt, Optics and Lasers including Fibers and Optical Waveguides, 1986, Springer–Verlag, 3rd Ed., pp. 8–9.*
International Search Report dated Sep. 17, 2002 for corresponding International Application No. PCT/US01/19950.

Primary Examiner—Edward J. Glick
Assistant Examiner—Glen Kao
(74) Attorney, Agent, or Firm—Stoel Rives LLP

(57) ABSTRACT

An automatic distancing, focusing and optical imaging apparatus for optical imaging of an object is disclosed, having at least one lens, a distancing sensor adapted to receive light rays representative of the image that travel through the lens, an imaging sensor adapted to receive light rays representative of the image that travel through the lens, and at least one processor coupled to the distancing sensor and the imaging sensor, the processor for controlling the movement of the imaging sensor to a position for optimal imaging and for processing the image received by the imaging sensor.

55 Claims, 4 Drawing Sheets

U.S. PATENT DOCUMENTS

| | | |
|---|---|---|
| 5,814,803 A | 9/1998 | Olmstead et al. |
| 5,837,987 A | 11/1998 | Koenck et al. |
| 5,847,833 A | 12/1998 | Yokoyama et al. |
| 5,864,404 A * | 1/1999 | Amorosi .................... 356/627 |
| 5,920,056 A | 7/1999 | Bonnet ....................... 235/383 |
| 5,923,017 A | 7/1999 | Bjorner et al. ............... 235/385 |
| 5,974,272 A | 10/1999 | Kiesow et al. |
| 6,072,529 A | 6/2000 | Mutze ........................ 348/351 |
| 6,085,039 A * | 7/2000 | Hamada et al. .......... 250/208.1 |
| 6,095,421 A | 8/2000 | Barkan et al. |
| 6,122,001 A * | 9/2000 | Micaletti et al. ............... 348/91 |
| 6,123,264 A | 9/2000 | Li et al. |
| 6,128,086 A * | 10/2000 | Fowler et al. ............... 250/342 |
| 6,177,999 B1 * | 1/2001 | Wurz et al. .................. 356/623 |
| 6,414,292 B1 * | 7/2002 | Afghahi .................... 250/208.1 |

* cited by examiner

APPARATUS FOR OPTICAL DISTANCING AUTOFOCUS AND IMAGING AND METHOD OF USING THE SAME

BACKGROUND OF THE INVENTION

The field of the present invention relates, in general, to an apparatus and method for optical imaging, and, in particular, to an apparatus and method for optical imaging that includes distancing and automatic focusing capability.

In the past, at least three conventional approaches were used to obtain a focused image in an imager, 1) using a small aperture (Large F-Stop) adjacent the imaging lens to create a large depth of field 2) using ultrasonic detection with an autofocusing apparatus and 3) using high-powered laser detection with an autofocusing apparatus. Each of these approaches will be described briefly.

In the first approach, a small aperture adjacent the imaging lens allows for a large depth of field such that an object will be in focus provided it falls within the depth of field. A drawback, however, is that the small aperture permits less light to travel through the lens, yielding poorer contrast and image quality. As a result, a separate light source is required for this approach, adding to its complexity and cost. The large depth of field also renders it difficult to accurately determine the distance from the lens to the object. Finally, the small aperture yields a lower optimal resolution for the image.

The second approach employs ultrasonic sound waves to determine the distance to an object from the lens of the imager, and based on this distance, a separate autofocusing apparatus is used to focus the image. Ultrasonic waves directed at the object reflect off the object, back to an ultrasonic detector. Based on the time lapse and/or the phase shift between the emission wave and the detected wave, the distance to the object may be determined. A lens positioning mechanism or other autofocus apparatus adjusts the focus based on the determined distance. A drawback with this technique is that two separate wave paths are used to focus and capture an image, the first path is the ultrasonic path and the second is the image path. Ultimately, the two paths make the system more complex, and in the case where the ultrasonic emission system is not integrated with the image detection system, over time the systems may become miscalibrated, leading to blurred images.

The third approach employs a high-powered laser to determine the distance from the image lens to an object, and based on this distance, a separate autofocusing apparatus is used to focus the image. The laser projects a laser beam onto the surface of an object, creating a laser spot. The projected laser spot is viewed from an angle relative to the laser beam, and the position of the reflected spot image allows the instantaneous distance of the object's distance to be gauged. A separate autofocus apparatus uses this distance information to manipulate the lens to bring the object into focus. Along with the complexity added by the separate laser emission detection system, another drawback of this approach is that the potential exposure of high-powered laser light to the eyes of workers presents a potential human safety hazard.

Thus, the present inventor has recognized a need for an integrated apparatus capable of automatically focusing an image of an object, yielding high-quality optical resolution, even in low light conditions, without the potential health hazards associated with laser light radiation.

SUMMARY OF THE INVENTION

The present invention in one aspect is directed to an automatic focusing and optical imaging apparatus for optical imaging of an object. In a preferred construction, the apparatus includes at least one lens, a distancing sensor adapted to receive light rays representative of the image that travel through the at least one lens, an imaging sensor adapted to receive light rays representative of the image that travel through the at least one lens, and at least one processor coupled to the distancing sensor and the imaging sensor for controlling the movement of the imaging sensor to a position for optimal imaging, and processing the image received by the imaging sensor.

Yet another aspect of the invention includes a method for automatically focusing and optical imaging an object using an automatic focusing and optical imaging apparatus. The method includes determining the distance from the automatic focusing and optical imaging apparatus to the object using a distancing sensor in the apparatus, adjusting the position of an imaging sensor in the apparatus to a position for optimal imaging based on the distance determining step, and optically imaging the object using the imaging sensor.

Other and further objects, features, aspects, and advantages of the present inventions will become better understood with the following detailed description of the accompanying drawings.

BRIEF DESCRIPTION OF THE DRAWINGS

The following drawings illustrate both the design and utility of preferred embodiments of the invention. In the drawings, similar elements are referred to by common reference numbers.

DETAILED DESCRIPTION OF THE PREFERRED EMBODIMENTS

Figure 1:
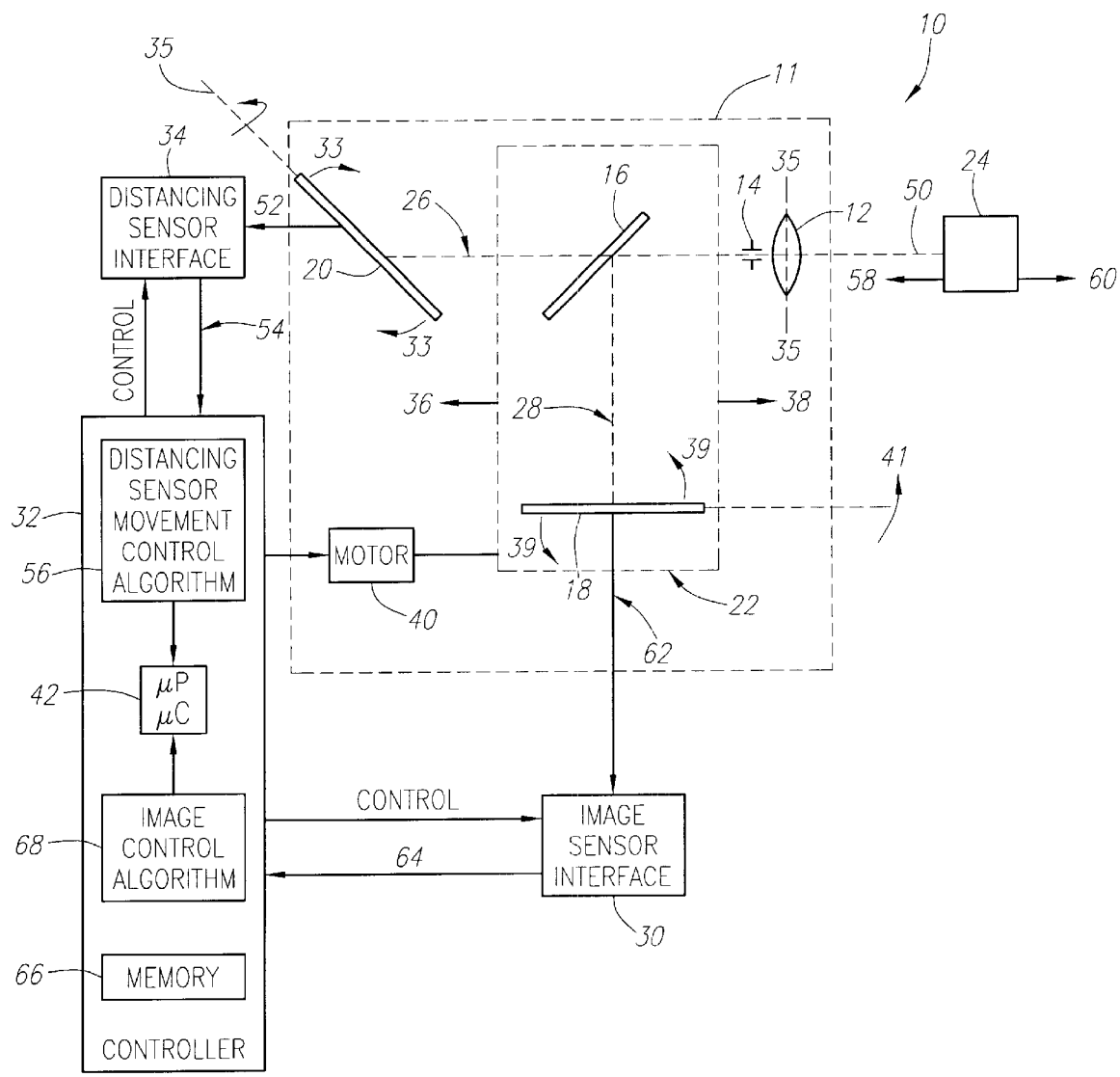
FIG. 1 is a diagram of an integrated distancing, focusing and imaging apparatus constructed in accordance with an embodiment of the invention.

With reference to FIG. 1, an integrated distancing, autofocusing and imaging apparatus 10, which is constructed in accordance with a preferred embodiment will now be described. The apparatus 10 is capable of determining the distance between an object 24 and a lens assembly 12, and using this distance to optimally focus the image of the object 24 on an image sensor 18.

The lens assembly 12 includes a low f-stop aperture 14, i.e., the aperture is relatively wide permitting a relatively large amount of light to pass therethrough. The low f-stop aperture 14 preferably has an aperture size that is large enough so that an additional light source is not required, but small enough that the apparatus 10 will have a sufficiently large depth of field.

The beam splitter 16 splits the optical image of the object 24 into a pair of images represented by the optical lines 26 and 28, approximately 50% to the imaging sensor 18 and approximately 50% to the distancing sensor 20. A beam splitter is basically optical glass with a mirror type coating, and can be purchased through the Edmund's Scientific catalogue in New Jersey. While a 50/50 beam splitter is preferred, other ratios such as 30/70 or 70/30 may be appropriate depending on the application. Although the beam splitter 16 is shown as reflecting the optical image of the object 24 onto the imaging sensor 18 and transmitting the optical image of the object 24 onto the distancing sensor 20, in an alternative embodiment, the opposite may be true. The beam splitter 16 may transmit the optical image of the object 24 onto the movable imaging sensor 18, and reflect the optical image of the object 24 onto the distancing sensor 20.

The imaging sensor 18 preferably comprises a two-dimensional active pixel CMOS array. The image sensor 18 may comprise a rectangular two-dimensional array of CMOS pixels, or else may, for example, comprise several intersecting or crossing linear arrays of CMOS pixels, oriented at different angles. An example of one type of active pixel CMOS array that may be used as image sensor 18 is described in copending U.S. patent application Ser. No. 08/697,408, which is assigned to the assignee of the present invention, and is hereby incorporated by reference as if set forth fully herein. Alternative image sensors (such as, e.g., a linear CMOS array, or a one or two dimensional charged coupled device (CCD)) may be used instead of a two-dimensional active pixel CMOS array, if appropriate modifications are made to the readout circuitry and signal processing particulars. The imaging sensor 18 may be coupled to an image sensor interface 30 and a controller 32 for controlling the capture of the image and movement of the movable assembly 22.

The distancing sensor 20 is preferably also a two-dimensional active pixel CMOS array that employs the Scheimpflug principle by being disposed at an angle relative to the plane 35 defined by the lens 12, causing the projected image of the object 24 to be stretched across the distancing sensor 20. Other sensors instead of a two-dimensional active pixel CMOS array may be used as a distancing sensor 20 such as, e.g., a linear CMOS array, or a one or two dimensional charged coupled device (CCD) if appropriate modifications are made to the readout circuitry and signal processing particulars. An advantage of using a Scheimpflug array sensor 20 is that it allows the depth of field of the apparatus 10 to be increased without having to raise the f-number of the f-stop 14. Accordingly, the aperture size of the f-stop is not decreased and adequate light is allowed through the apparatus 10, eliminating the need for a separate light source. Along the distancing sensor 20, some portions of the image will be out of focus and some portions will be in focus. The best contrast modulation (CMF) point corresponds to the crispest, most in-focus point of the stretched image on the distancing sensor. The distancing sensor 20 may be coupled to a distancing sensor interface 34 and a controller 32 for processing captured information from the distancing sensor 20 and controlling movement of the movable assembly 22.

Alternatively, or in addition, the controller could process the information from the distancing sensor 20 to determine a CMF plane instead of, or in addition to, a CMF point. A CMF plane would be desirable when the object's surface is not parallel to the plane 35 generally defined by the lens 12 (FIG. 1 illustrates an object's surface that is parallel to the lens plane 35). The distancing sensor 20 may be adapted to be rotate in the direction of the arrows 33 and/or rotated about the axis 35. The controller 32 may cause the distancing sensor 20 to rotate about the two axes to determine the best CMF plane.

In the embodiment illustrated in FIG. 1, the movable assembly 22 houses the beam splitter 16 and the imaging sensor 18, both of which are fixed in distance and orientation to each other. The plane of the imaging sensor 18 is parallel to the plane of image projected on the imaging sensor 18. The assembly 22 is longitudinally movable with respect to the rest of the apparatus 10, along a direction perpendicular to a plane 35 generally defined by the lens 12 (movement illustrated by arrows 36 and 38). Movement of the assembly 22 along directions 36 and 38 changes the distance of the imaging sensor 18 to the focal length of the image such that the image can be focused on the imaging sensor 18 when the imaging sensor 18 reaches the focal length of the image as determined by the CMF point. Although FIG. 1 illustrates the object's surface as being parallel to the plane 35 generally defined by the lens 12, the object's surface may not be parallel. The imaging sensor 18 may be adapted to be rotated in the direction of arrows 39 and/or rotated about the axis 41. The controller 32 may cause the imaging sensor 18 to rotate to a position that corresponds to the best CMF plane (as discussed above) and, thus, the sharpest image.

Figure 2A:
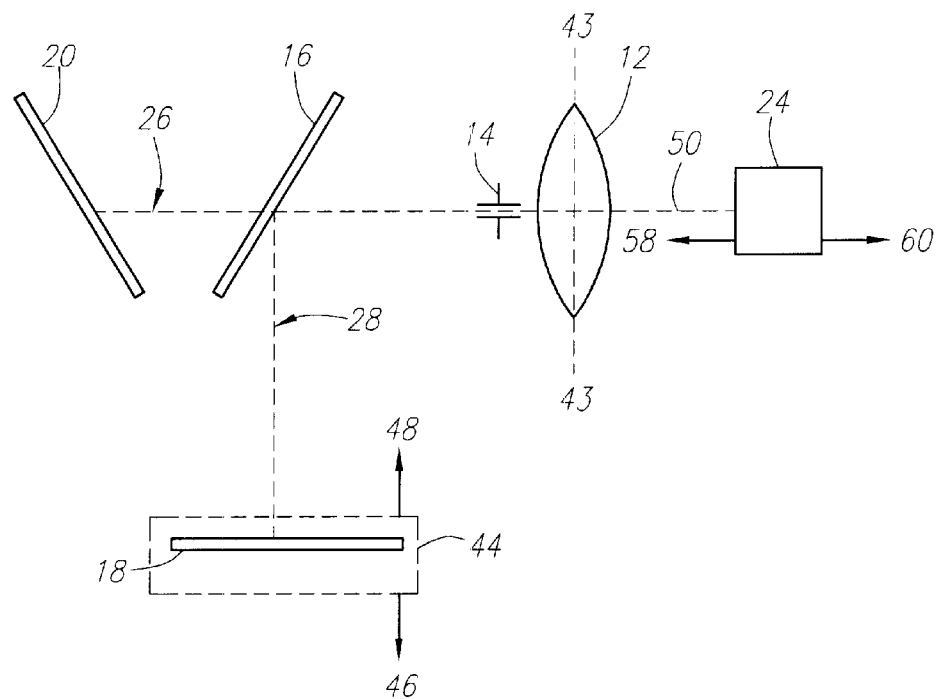
FIG. 2A is a diagram of an integrated distancing, focusing and imaging apparatus constructed in accordance with an additional embodiment of the invention.

A motor 40 may be coupled to the controller 32 for imparting precise movement of the movable assembly 22 via a suitable mechanism that would allow movement to be imparted to the movable assembly 22. In an alternative embodiment, a movable assembly 44 (FIG. 2A) carries an imaging sensor 18, but not the beam splitter 16. The movable assembly 44 moves parallel to a plane 43 generally defined by the lens 12 (movement illustrated by arrows 46 and 48) to change the position of the imager sensor 18 to the focal length of the image. Otherwise, movable assembly 44 is controlled in a manner similar to that of movable assembly 22. The movable assembly 22 would be advantageous in applications where more longitudinal space is available and the movable assembly 44 would be advantageous in applications where more lateral space is available. The motor 40 and other components of the apparatus 10 requiring power may be powered by batteries, fuel cells, or other suitable power supply/source. With reference to FIG. 2A, the motor 40 or one or more additional motors may be coupled to the distancing sensor 20 and/or the imaging sensor 18 for rotation to a position corresponding to the best CMF plane.

Figure 2B:
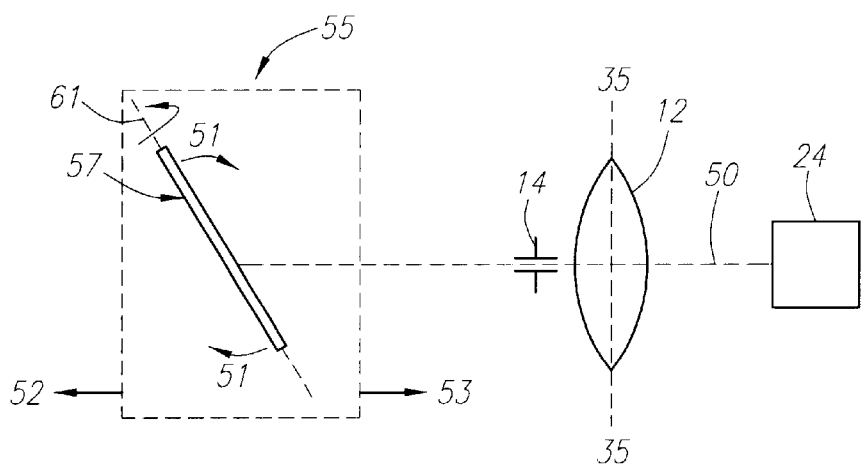
FIG. 2B is a diagram of an integrated distancing, focusing and imaging apparatus constructed in accordance with an additional embodiment of the invention.

In an alternative embodiment, a movable assembly 55 (FIG. 2B) carries a single sensor 57. The sensor 57 is preferably disposed at an angle relative to the plane of the lens 35, such that the image is stretched across the sensor 57 with some portions of the image in focus and other portions out of focus. Once the CMF point is determined as described above, the sensor 57 is rotated along the direction indicated by arrows 51 to an appropriate plane. The movable assembly 55 then moves perpendicular to a plane 35 generally defined by the lens 12 (movement illustrated by arrows 52 and 53) to change the position of the sensor 57 to the precise focal length of the image, and an image is captured. The assembly 55 may be moved before, after or simultaneous to the rotating the sensor 57. Alternatively, or in addition, the CMF plane may be determined by rotating the sensor 57 in the direction of arrows 51 and/or about the axis 61. The position and orientation of the sensor 57 and the assembly 55 may then be manipulated by the controller 32 to capture a crisp image. Thus, unlike the previously described embodiments, the embodiment in FIG. 2B contains a single sensor that performs both the distancing and imaging functions of the apparatus.

In use, the object 24 may be placed in front of the lens 12 of the apparatus 10 if the apparatus 10 is part of a fixed imager or the apparatus 10 may be moved so that the object 24 is in front of the lens 12 if the apparatus 10 is part of a portable imager. Examples of fixed imagers include, but not by way of limitation, an on or above-counter hands free reader, an in-counter hands free reader, and an automatic high speed dimensioning system used to determine the dimensions of boxes on a conveyor belt. Examples of portable imagers include, but not by way of limitation, one-dimensional and two-dimensional handheld readers.

Light is reflected from the object 24, causing a reflected image of the object 24 (illustrated as phantom optical line 50) to travel through the lens 12 and the low f-stop aperture 14 to the beam splitter 16. The presence of the low f-stop aperture 14 (i.e., a wide aperture) eliminates the need for an additional or separate illumination source, so that the imaging sensor 18 can rely on ambient light to illuminate the object 24. The wide aperture also increases the amount of light projected on the image sensor 18, increasing imaging sensitivity and yielding higher quality images.

The beam splitter 16 splits the optical image 50 of the object 24, yielding first and second images represented by the optical lines 26 and 28, respectively.

The first image 26 is projected onto the distancing sensor 20. The first image 26 of the object 24 is stretched across the distancing sensor of the sensor 20, such that along the distancing sensor 20 some portions of the first image 26 will be out of focus and some portions will be in focus. The distancing sensor 20 may be coupled to a distancing sensor interface 34 and a controller 32 for finding the best CMF point. The distancing sensor interface 34 receives an output signal 52 corresponding to the captured first image 26 on the distancing sensor 20, conditions the output signal 52 received from the distancing sensor 20, and generates an output signal 54, which is received by the controller 32. If an analog-to-digital converter is aboard the distancing sensor 20, which is often the case, less conditioning may be required of the distancing sensor interface 34.

The microprocessor 42 of the controller 32 may run a distancing sensor movement control algorithm (DMCA) 56 that determines the CMF point and corresponding focal length of the captured first image 26 based on the received signal 54 and causes the image sensor 18 to be moved in the direction of arrows 36, 38 and/or 39 to the calculated focal length via the motor 40 and movable assembly 22 so that the second image 28 can be crisply focused on the imaging sensor 18. Preferably, the DMCA 56 is stored in nonvolatile memory such as an EEPROM, a flash prom, or a memo card such as a Memory Stick™. The focal length of an image of the object 24, and consequently the position of the assembly 22, will change as different objects are located closer and further from the lens 12 along the directions illustrated by arrows 58 and 60. The controller 32 then controls the movement of the assembly 22 such that the second image 26 is crisply focused on the imaging sensor 18.

It should be noted, the interfaces 30, 34 and controller 32 (including the processor 42) may form part of an integrated assembly with the lens assembly 12, the low f-stop aperture 14, the beam splitter 16, the image sensor 18, the distancing sensor 20, and the movable assembly 22, and be mounted in the case 11.

After the movable assembly 22 is moved to the precise location for optimal imaging, light 20 reflected from the beam splitter 16 is detected by the image sensor 18. As noted above, a preferred image sensor 18 is constructed as an active pixel CMOS device containing a two-dimensional array of pixels. Each pixel of the image sensor 18 detects the amount of light incident at its particular location and stores an electrical charge that varies as a function of the incident light. After the image sensor 18 has been exposed to the light reflected by the object 24, data from all the CMOS pixels is sequentially read out in a selectable pattern (which may be row-by-row, column-by-column, or some other pattern). The image sensor 18 generates an analog video output signal 62.

The image sensor interface 30 conditions the analog video output signal 62 received from the image sensor 18 and generates an output signal 64. Either analog or digital signal processing (which may include, for example, amplification and/or filtering) may be utilized in the image sensor interface 30. Preferably, the image sensor interface 30 sets the exposure time and thresholding.

The output signal 64 of the image sensor interface 30 may include, but not by way of limitation, binary digital image data, gray-scale pixel data, run-length encoded binary data, or data compressed by some other compression scheme. To obtain gray-scale pixel data, the analog video output signal 62 may be converted to digital form (represented by any suitable number of bits, depending upon accuracy requirements and component tolerances) by the image sensor interface 30 using an analog-to-digital (A/D) converter.

The output of the image sensor interface 30 is provided to the controller 32. Transfer of the digital image data of the image sensor interface output signal 64 from the image sensor interface 30 to the controller 32 may be accomplished by any of a number of suitable techniques. For example, the image sensor output signal 64 may be in the form of binary video information, in which the lines of video information are sent one at a time, sequentially, with the data from individual pixels sent sequentially within each line. Alternatively, the image sensor interface 30 may load the digital image data of the image sensor interface output signal 64 directly (direct memory access (DMA)) into a memory 66, such as a dual-port or shared random-access memory (PAM), which could then be accessed by the controller 32. As yet another alternative, the image sensor interface 30 may load the digital image data of the image sensor interface output signal 64 into a first-in-first-out (FIFO) buffer (not shown). Other approaches to transferring the digital image data of the image sensor interface output signal 64 from the image sensor interface 30 to the controller 32 may also be used.

In the preferred embodimient, the controller 32 includes an image sensor control algorithm (ICA) 68 run by the microprocessor/microcontroller (uP/uC) 42 for, inputting data from the image sensor interface 30, and for decoding that data. Preferably, the ICA 68 is stored in nonvolatile memory.

Operating under control of the ICA 68, the controller 32 receives the digital image data of the image sensor interface output signal 64 from the image sensor interface 30. The handling of the inputted image data depends upon the format in which it was sent. For example, if the image sensor interface 30 generates binary video information, the controller 32 will preferably take this data and store it in memory 66 (e.g., RAM), so that the controller 32 will have access to the entirety of the pixel data necessary for decoding.

After receiving the digital image data of the image sensor interface output signal 64, the controller 32 then decodes the image data to determine the information on the object 24 contained within the captured image. Design and implementation of ICA 68 for controlling the image sensor 18 and for decoding the captured image data is considered well within the purview of those skilled in the art.

Alternatively, as noted previously herein, instead of using a twb-dimensional CMOS imaging array, the image sensor 18 may use a one-dimensional CMOS imaging array (i.e., a linear array) or a linear CCD array that only images a single line of a target at a time. Such a linear imaging array may be used to build up a two dimensional image by moving either the image sensor 18 or the target across the field of view of the linear array, and capturing successive one-dimensional reads. The resulting built-up image may be stored in a RAM, and, once captured, can be processed in the same manner as the two-dimensional image described above. As yet another alternative, a one-dimensional image captured by a one-dimensional CMOS imaging array (or linear CCD array) may be processed directly. In some circumstances, however, such a technique might require a more precise alignment of the image sensor 18 with the target barcode or other symbol or indicia as compared to the two-dimensional system described above.

In the preferred embodiments illustrated in FIGS. 1 and 2, the integrated distancing, focusing and imaging functions use a single optical path 50, imparting the advantage that focusing does not become miscalibrated vis-à-vis imaging, thus ensuring high quality images. Also, the combination of an autofocusing mechanism (assembly 22 in FIG. 1, assembly 44 in FIG. 2A or assembly 55 in FIG. 29) and the large aperture lens assembly 14 creates a wide range (depth of field) in which an image will be in focus, and throughout that range, a large amount of light will reach the imaging sensor 18. Thus, sharp crisp images with superior contrast, higher resolution and superior color attributes can be generated. Although the apparatus 10 has been described as an imager, in an alternative embodiment of the invention, the apparatus 10 may include a laser scanner.

With reference to FIGS. 3A–3D, an embodiment of an apparatus 70 and method for distancing, dimensioning, autofocusing and imaging will now be described. The apparatus 70 will be described in conjunction with an exemplary application, namely, in an automatic dimensioning system for reading boxes 72 and determining sizes of the boxes 72. The apparatus 70 may be used in applications other than those described herein. For example, the apparatus 70 may be used to scan the surface area of an upper exposed panel of the box 72 for relevant information encoded in one or more bar codes or other symbols or indicia on the box 72. The imaging apparatus 70 includes two general components, a distancing mechanism 74 and a focusing and imaging mechanism 76, each of which are described separately below.

Figure 3A:
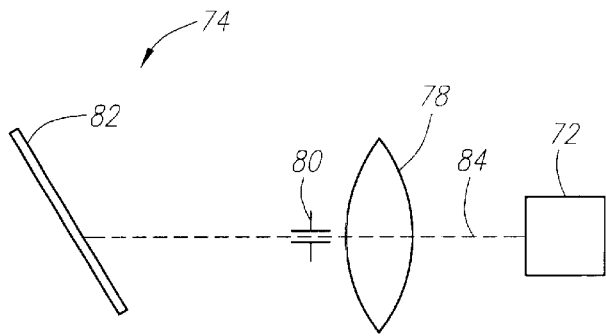
FIG. 3A is a diagram of an embodiment of a distancing mechanism.

FIG. 3A illustrates an embodiment of the distancing mechanism 74 of the apparatus 70. The distancing mechanism 74 generally includes a lens assembly 78, a low f-stop aperture 80, and a distancing sensor 82. An object to be scanned, such as a box 72, may be positioned in front of the lens 78 so that the lens 78 picks up an image of the box (the image travels through the apparatus along the optic line 84) and projects the image through the low f-stop aperture 80, onto the two-dimensional distancing sensor 82 As discussed above, the low f-stop aperture 80 is preferably relatively large so that the need for a separate light source is reduced or eliminated. The distancing sensor 82 is preferably disposed at an angle relative to the plane of the lens, such that the image is stretched across the distancing sensor 82 with some portions of the image in focus and other portions out of focus. The distance sensor 82 is preferably coupled to a controller 86 (FIG. 3D) via a distancing sensor interface such as that described above for determining the CMF point, i.e., the point where the image is in focus. Alternatively, the CMF plane may be determine by rotating the distancing sensor 82 as described above.

Figure 3B:
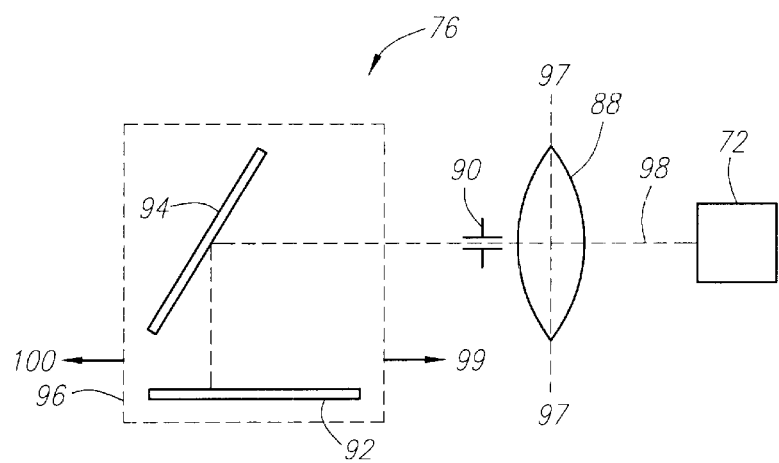
FIG. 3B is a diagram of an embodiment of a focusing and imaging mechanism.
Figure 3C:
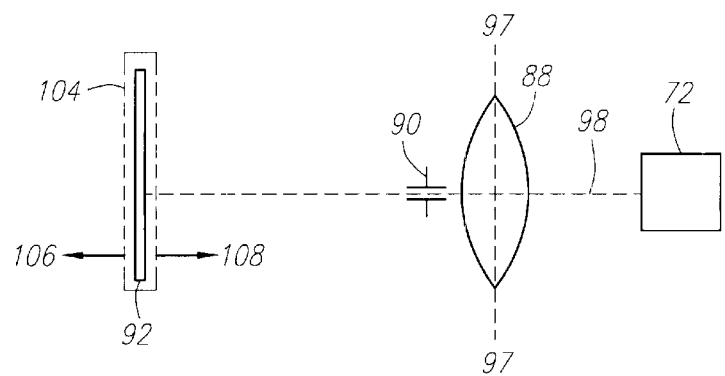
FIG. 3C is a diagram of another embodiment of a focusing and imaging mechanism.

FIG. 3B illustrates an embodiment of the focusing and imaging mechanism 76 of the apparatus 70. The focusing and imaging mechanism 76 generally includes a lens assembly 88, a low f-stop aperture 90, an imaging sensor 92, a bend mirror 94, and a movable assembly 96. The box 72 (same box as in FIG. 3A) is positioned in front of the lens 88 so that the lens 88 picks up an image of the box 72 (the image travels through the apparatus along the optic line 98) and projects the image through the low f-stop aperture 90, onto the bend mirror 94 that reflects that image onto a two-dimensional imaging sensor 92. The bend mirror 94 and the imaging sensor 92 are positioned at a fixed distance and orientation relative to each other, but form a movable assembly 96 that can move perpendicular to a plane 97 generally defined by the lens 88 (movement illustrated by arrows 99 and 100). The plane of the imaging sensor 92 is parallel to the plane of image projected on the imaging sensor 92. In a manner similar to that described above with respect to FIG. 1, the controller 86 shown in FIG. 3D preferably controls the movement of the image sensor 92 via an image sensor interface, motor, and the movable assembly 96 based on determination of the CMF point or the CMF plane from the method described above with respect to FIG. 3A. As described above with respect to FIG. 2A, instead of the movable assembly 96 moving both the mirror 94 and the imager sensor 92 in a longitudinal direction, the movable assembly 96 may move just the imager sensor 92 in a lateral or vertical direction. This latter arrangement would be advantageous in applications where more lateral space is available. In a further embodiment of the inventions as illustrated in FIG. 3C, the image sensor 92 may be aligned with the lens 88 and the image line 98 so that a movable assembly 104 moves the image sensor 92 perpendicular to a plane 97 generally defined by the lens 88 (movement illustrated by arrows 106 and 108), eliminating the need for a mirror 94. The movable assemblies 96 and 104 illustrated in FIGS. 3B and 3C would be advantageous in applications where more longitudinal space is available. Alternatively, the image sensor 92 may be rotated to correspond with the CMF plane as described above.

Figure 3D:
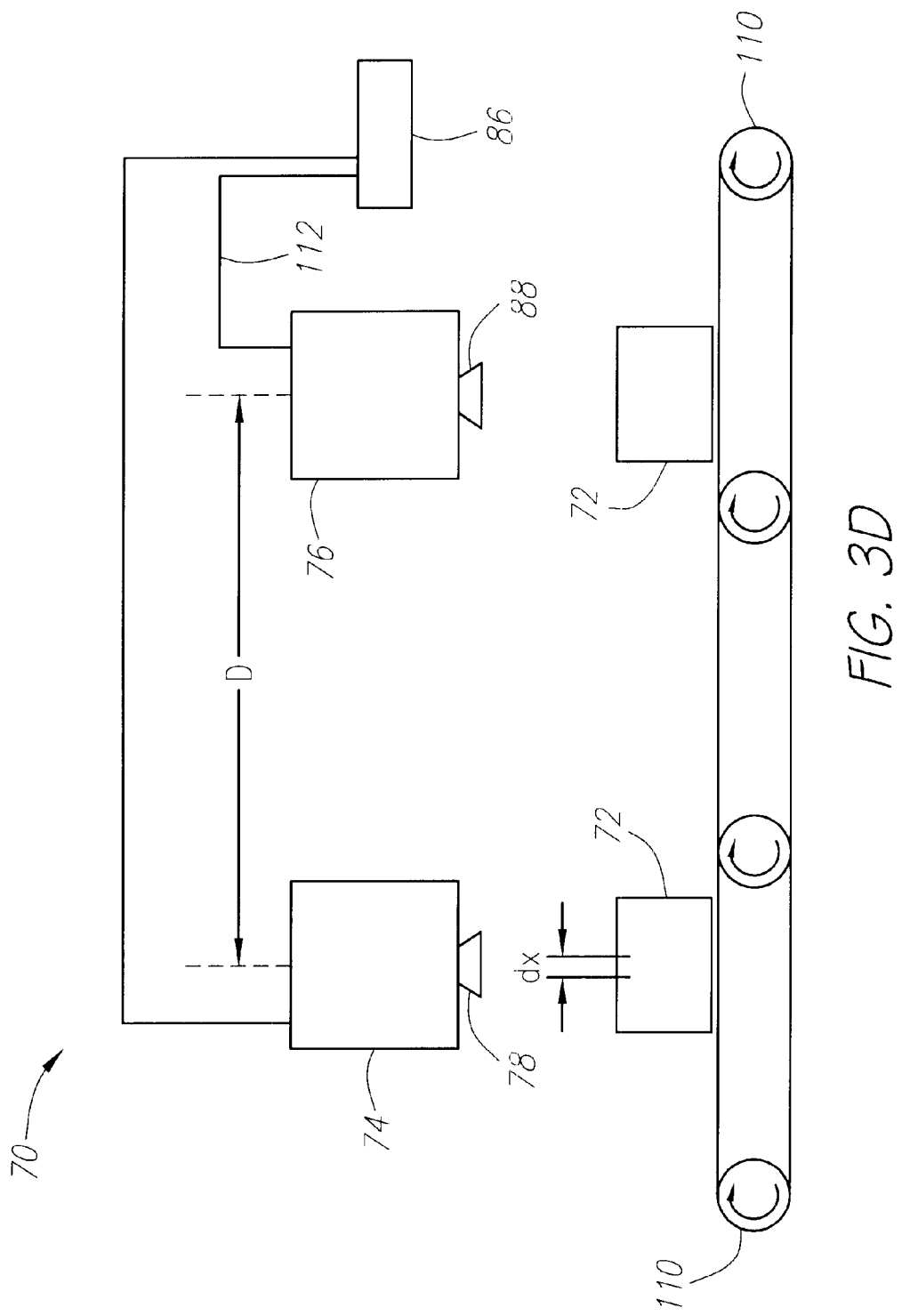
FIG. 3D is a schematic diagram of a distancing, focusing and imaging apparatus constructed in accordance with a further embodiment of the invention, in which the distancing mechanism of FIG. 3A may be used in conjunction with the focusing and imaging mechanism of FIG. 3B or FIG. 3C.

FIG. 3D illustrates an embodiment of the apparatus 70 used in an automatic dimensioning system for determining the dimensions and/or surface characteristics of the boxes 72 transported on a conveyor belt 110. The lenses 78, 88 of the distancing mechanism 74 and focusing and imaging mechanism 76 may be pointed downward, towards the conveyor belt 110. The distancing mechanism 74 and the imaging and focusing mechanism 76 are separated by a fixed distance D. As a box 72 travels from left to right on the conveyor belt 110, the distancing mechanism 74 and the controller 86 determine the distance from the lens 78 to the box 72 or from the lens to only a discrete section dx of the box 72. In the latter situation, many discrete sections dx may be taken as the box 72 moves under the lens 78. Those sections dx may be processed by the controller 86 to construct a surface profile of the box 72 and/or the height of the box 72. The length of the box 72 and the width of the box, and hence the volume of the box, may be determined if distancing mechanisms 76 are positioned in front of the box 72 and to the side of the box 72, respectively. The controller 86 is also aware of the distance D between the distancing mechanism 74 and the focusing and imaging mechanism 76 and the controller 86 is also aware of the speed of the conveyor belt 110. With the fixed distance D between the two mechanisms and the speed of the conveyor belt 110 known, the controller 86 can calculate the time a particular box 72 read by the distancing mechanism 74 will reach the focusing and imaging mechanism 76 by the formula (D/(conveyor belt speed)). The controller 86 determines where the image sensor 92 of the focusing and imaging mechanism 76 should be located for optimal imaging of the box 72 or a discrete section dx of the box 72 based on the distance data generated with the help of the distancing mechanism 74 and ensures that the movable assembly 96 moves the image sensor 92 to that position in a timely manner so that an optimal image of the box 72 or a discrete section dx of the box 72 can be captured. The focusing and imaging mechanism 76 adjusts to focus an ideal image of the box 72 on the imaging sensor 92 and sends the imaging data to the controller 86 via the data transmission line 112. After receiving the data from the focusing and imaging mechanism 76, the controller 86 can manipulate the data to determine, for example, the surface area of an upper exposed panel of the box 72 or the relevant information encoded in one or more bar codes or other symbols or indicia on the box 72. As discussed above, an advantage to the imaging apparatus 70 is that the low f-stop aperture 90 yields increased image sensitivity and higher quality image reads in ambient light conditions without a need for additional light sources. One or more of the apparatuses 70 may be used for purposes in addition to or other than those described herein. For example, one or more apparatuses 90 may be positioned in one or more locations, at various orientations relative to the box 72, to perform one or more of the following tasks: determine multiple dimensions of boxes 72, determine multiple surface characteristics of the boxes 72, read one or more bar codes or other symbols or indicia representative of relevant information, and determine the volumes of boxes 72.

Although the present invention has been described above in the context of certain preferred embodiments, it is to be understood that various modifications may be made to those embodiments, and various equivalents may be substituted, without departing from the spirit or scope of the invention.

What I claim is:

1. An automatic focusing and optical imaging apparatus for optical imaging of an object, comprising:
    at least one lens;
    a first sensor comprising a distancing sensor adapted to receive light rays representative of an image of the object that travel through said at least one lens;
    a second sensor comprising an imaging sensor adapted to receive light rays representative of the image that travel through said at least one lens and said imaging sensor is adapted to move; and
    at least one processor coupled to the distancing sensor and the imaging sensor for controlling the movement of the imaging sensor to a position of optimal imaging, and for processing the image received by said imaging sensor,
    wherein the distancing sensor is a Scheimpflug optical array.

2. The automatic focusing and optical imaging apparatus of claim 1, wherein the imaging sensor is a 2D optical array.

3. The automatic focusing and optical imaging apparatus of claim 1, wherein the imaging sensor is a 1D optical array.

4. The automatic focusing and optical imaging apparatus of claim 1, wherein the distancing sensor is a 2D Scheimpflug optical array.

5. The automatic focusing and optical imaging apparatus of claim 1, wherein the distancing sensor is a 1D Scheimpflug optical array.

6. The automatic focusing and optical imaging apparatus of claim 1, wherein said at least one lens, imaging sensor, distancing sensor, and at least one processor are part of a single integrated assembly.

7. The automatic focusing and optical imaging apparatus of claim 1, wherein the apparatus is part of a fixed imaging device.

8. The automatic focusing and optical imaging apparatus of claim 1, wherein the apparatus is part of a portable hand-held imaging device.

9. The automatic focusing and optical imaging apparatus of claim 8, wherein the apparatus is adapted to determine one or more dimensions of the object by determining one or more distances to said object with said distancing sensor and said at least one processor.

10. The automatic focusing and optical imaging apparatus of claim 8, wherein the apparatus is part of an automatic high-speed dimensioning system.

11. The automatic focusing and optical imaging apparatus of claim 1, wherein said distancing sensor is adapted to rotate in one or more directions to find a best CMF plane and said imaging sensor is adapted to rotate in one or more directions to a position corresponding to the best CMF plane.

12. An automatic focusing and optical imaging apparatus for optical imaging of an object, comprising:
    at least one lens for focusing an image of the object;
    an aperture positioned downstream of said at least one lens;
    a distancing sensor adapted to receive light rays representative of the image of the object that travel through said at least one lens and through said aperture;
    an imaging sensor adapted to receive light rays representative of the image that travel through said at least one lens and through said aperture, said imaging sensor is adapted to move;
    at least one processor coupled to the distancing sensor and the imaging sensor for controlling the movement of the imaging sensor to a position of optimal imaging, and for processing the image received by the imaging sensor; and
    a beam splitter adapted to partially transmit the light rays representative of the image onto one of the distancing sensor or the imaging sensor and partially reflect the light rays representative of the image onto the other of the distancing sensor or the imaging sensor,
    wherein the distancing sensor is a Scheimpflug optical array.

13. The automatic focusing and optical imaging apparatus of claim 12, wherein the imaging sensor is adapted to be moved relative to the beam splitter in response to the distance to the object determined by said distancing sensor and said at least one processor.

14. The automatic focusing and optical imaging apparatus of claim 13, wherein the lens generally defines a plane and the imaging sensor moves parallel to said plane if the light rays representative of the image are reflected by said beam splitter onto said imaging sensor and the imaging sensor moves perpendicular to said plane if the light rays representative of the image are transmitted by said beam splitter onto said imaging sensor.

15. An automatic focusing and optical imaging apparatus for optical imaging of an object, comprising:

at least one lens;

a distancing sensor adapted to receive light rays representative of an image of the object that travel through said at least one lens;

an imaging sensor adapted to receive light rays representative of the image that travel through said at least one lens and said imaging sensor is adapted to move;

at least one processor coupled to the distancing sensor and the imaging sensor for controlling the movement of the imaging sensor to a position of optimal imaging, and for processing the image received by said imaging sensor;

a beam splitter adapted to partially transmit the light rays representative of the image onto one of the distancing sensor or the imaging sensor and partially reflect the light rays representative of the image onto the other of the distancing sensor or the imaging sensor, wherein the beam splitter and imaging sensor are fixed relative to each other and adapted to be moved together in response to a distance to the object determined by said distancing sensor and said at least one processor.

16. The automatic focusing and optical imaging apparatus of claim 15, wherein the lens generally defines a plane and the beam splitter and imaging sensor move perpendicular to said plane.

17. An automatic focusing and optical imaging apparatus for optical imaging of an object, comprising:

at least a first lens and a second lens;

a first sensor comprising a distancing sensor adapted to receive light rays representative of an image of the object that travel through said first lens;

a second sensor comprising an imaging sensor adapted to receive light rays representative of the image that travel through said second lens and said imaging sensor is adapted to move; and at least one processor coupled to the distancing sensor and the imaging sensor for controlling the movement of the imaging sensor to a position of optimal imaging, and for processing the image received by said imaging sensor, wherein the distancing sensor is a Scheimpflug optical array wherein the imaging sensor is adapted to move and is part of an imaging mechanism and the distancing sensor is part of a separate distancing and surfacing mechanism, the separate imaging and distancing and surfacing mechanisms are separated by a predetermined distance, said separate imaging and distancing and surfacing mechanisms adapted to be fixed relative to said object, which moves at a predetermined speed past said imaging and distancing and surfacing mechanisms, said at least one processor adapted to obtain a surface profile for at least one surface of said object based on distance to object information retrieved from said distancing sensor and to timely control the movement of said imaging sensor to a position for optimal imaging based on distance to object information retrieved from said distancing sensor, said predetermined distance between said imaging and distancing and surfacing mechanisms, and said predetermined speed of said object.

18. The automatic focusing and optical imaging apparatus of claim 17, wherein the imaging sensor is a 2D optical array.

19. The automatic focusing and optical imaging apparatus of claim 17, wherein the imaging sensor is a 1D optical array.

20. The automatic focusing and optical imaging apparatus of claim 17, wherein the distancing sensor is a 2D Scheimpflug optical array.

21. The automatic focusing and optical imaging apparatus of claim 17, wherein the distancing sensor is a 1D Scheimpflug optical array.

22. The automatic focusing and optical imaging apparatus of claim 17, wherein the imaging mechanism includes a mirror adapted to reflect the light rays representative of the image onto the imaging sensor.

23. The automatic focusing and optical imaging apparatus of claim 22, wherein the mirror and imaging sensor are fixed relative to each other and adapted to be moved together in response to a distance to the object determined by said distancing sensor and at least one processor.

24. The automatic focusing and optical imaging apparatus of claim 22, wherein the lens generally defines a plane and the mirror and imaging sensor move perpendicular to said plane.

25. The automatic focusing and optical imaging apparatus of claim 22, wherein the imaging sensor is adapted to be moved relative to the mirror in response to the distance determined by said distancing sensor and said at least one processor.

26. The automatic focusing and optical imaging apparatus of claim 25, wherein the lens generally defines a plane and the imaging sensor moves parallel to said plane.

27. The automatic focusing and optical imaging apparatus of claim 17, wherein said imaging sensor is aligned with said lens and the light rays representative of the image transmitted through said lens in said imaging mechanism and adapted to move in response to the distance determined by said distancing sensor and said at least one processor.

28. A method for automatically focusing and optical imaging an object using an automatic focusing and optical imaging apparatus including at least one lens, comprising:

determining distance from the optical imaging apparatus to the object using a Scheimpflug optical array as a first sensor comprising a distancing sensor adapted to receive light rays through said at least one lens in the apparatus;

adjusting position of a second sensor comprising an imaging sensor adapted to receive light rays through said at least one lens in the apparatus to an optimal position for optimal imaging based on said distance determining step; and optically imaging the object using the imaging sensor.

29. The method of claim 28, wherein the imaging sensor is a 2D optical array, and optically imaging includes 2D optically imaging the object.

30. The method of claim 28, wherein the imaging sensor is a 1D optical array, and optically imaging includes 1D optically imaging the object.

31. The method of claim 28, wherein the distancing sensor is a 2D Scheimpflug optical array, and distancing includes 2D distancing using the Scheimpflug principle.

32. The method of claim 29, wherein the distancing sensor is a 1D Scheimpflug optical array, and distancing includes 1D distancing using the Scheimpflug principle.

33. The method of claim 28, further including using a beam splitter to transmit or reflect part of the light rays representative of an image of the object to the distancing sensor for determining the distance from the automatic focusing and optical imaging apparatus to the object and reflect or transmit part of the light rays representative of the image of the object for optically imaging the object using the imaging sensor.

34. The method of claim 33, wherein adjusting the position of an imaging sensor includes adjusting the position of the imaging sensor relative to said beam splitter in the apparatus to a position of optimal imaging based on said distance determining step.

35. The method of claim 34, wherein the lens generally defines a plane and the imaging sensor moves parallel to said plane if the light rays representative of the image are reflected by said beam splitter onto said imaging sensor and the imaging sensor moves perpendicular to said plane if the light rays representative of the image are transmitted by said beam splitter onto said imaging sensor.

36. The method of claim 28, wherein said at least one lens, imaging sensor, distancing sensor, and at least one processor are part of a single integrated assembly.

37. The method of claim 28, further including rotating said distancing sensor in one or more directions to find a best CMF plane and rotating said imaging sensor in one or more directions to a position corresponding to the best CMF plane.

38. The method of claim 28, wherein the imaging sensor is part of an imaging mechanism and the distancing sensor is part of a separate distancing and surfacing mechanism, the separate imaging and distancing and surfacing mechanisms separated by a predetermined distance, said separate imaging and distancing and surfacing mechanisms adapted to be fixed relative to said object, said object moves at a predetermined speed past said imaging and distancing and surfacing mechanisms, said method further including obtaining a surface profile for at least one surface of said object based on distance to object information retrieved from said distancing sensor and timely adjusting the position of said imaging sensor to a position for optimal imaging based on distance to object information obtained from said distancing sensor, said predetermined distance between said imaging and distancing and surfacing mechanisms, and said predetermined speed of said object.

39. The method of claim 38, wherein the imaging sensor is a 2D optical array, and optically imaging includes 2D optically imaging the object.

40. The method of claim 38, wherein the imaging sensor is a 1D optical array, and optically imaging includes 1D optically imaging the object.

41. The method of claim 38, wherein the distancing sensor is a 2D Scheimpflug optical array, and distancing includes 2D distancing using the Scheimpflug principle.

42. The method of claim 38, wherein the distancing sensor is a 1D Scheimpflug optical array, and distancing includes 1D distancing using the Scheimpflug principle.

43. The method of claim 38, wherein the imaging mechanism includes a mirror adapted to reflect light rays representative of the image onto the imaging sensor.

44. The method of claim 43, wherein the mirror and imaging sensor are fixed relative to each other and adjusting the position of an imaging sensor includes adjusting the position of the mirror and imaging sensor to a position of optimal imaging based on said distance determining step.

45. The method of claim 44, wherein the lens generally defines a plane and the mirror and imaging sensor move perpendicular to said plane.

46. The method of claim 43, wherein adjusting the position of an imaging sensor includes adjusting the position of the imaging sensor relative to said mirror to a position of optimal imaging based on said distance determining step.

47. The method of claim 46, wherein the lens generally defines plane and the imaging sensor moves parallel to said plane.

48. The method of claim 38, further including determining one or more dimensions of the object with said distance determining step.

49. The method of claim 48, wherein determining one or more dimensions of the object includes determining at least one of a length, height, and width of the object.

50. The method of claim 48, wherein determining one or more dimensions of the object includes determining one or more dimensions of boxes traveling on a conveyor system.

51. The method of claim 50, wherein determining one or more dimensions of boxes includes determining the volumes of the boxes using a distancing mechanism in front of the boxes, above the boxes and to the side of the boxes.

52. A method for automatically focusing and optical imaging an object using an automatic focusing and optical imaging apparatus including at least one lens, comprising:
   determining a distance from the automatic focusing and optical imaging apparatus to the object using a distancing sensor in the apparatus;
   adjusting the position of an imaging sensor in the apparatus to a position for optimal imaging based on said distance determining step;
   optically imaging the object using the imaging sensor;
   using a beam splitter to transmit or reflect part of the light rays representative of an image of the object to the distancing sensor for determining the distance from the automatic focusing and optical imaging apparatus to the object and reflect or transmit part of the light rays representative of the image of the object for optically imaging the object using the imaging sensor,
   wherein the beam splitter and imaging sensor are fixed relative to each other, and
   wherein adjusting the position of an imaging sensor includes adjusting the position of the beam splitter and the imaging sensor in the apparatus to a position of optimal imaging based on said distance determining step.

53. The method of claim 52, wherein the lens generally defines a plane and the beam splitter and imaging sensor move perpendicular to said plane.

54. An automatic focusing and optical imaging apparatus for optical imaging of an object, comprising:
   at least one lens;
   a first sensor comprising a distancing sensor adapted to receive light rays representative of an image of the object that travel through said at least one lens;
   a second sensor comprising an imaging sensor adapted to receive light rays representative of the image that travel through said at least one lens and said imaging sensor is adapted to move;
   at least one processor coupled to the distancing sensor and the imaging sensor for controlling the movement of the imaging sensor to a position of optimal imaging, and for processing the image received by said imaging sensor,
   wherein said distancing sensor is adapted to rotate about at least different axes to find a best CMF plane and wherein said imaging sensor is adapted to rotate said at least two different axes to a position corresponding to the best CMF plane.

55. A method for automatically focusing and optical imaging an object using an automatic focusing and optical imaging apparatus including at least one lens, comprising:
   determining a distance from the automatic focusing and optical imaging apparatus to the object using a first sensor comprising a distancing sensor in the apparatus;
   rotating said distancing sensor about at least two different axes to find a best CMF plane;
   adjusting the position of a second sensor comprising an imaging sensor in the apparatus to a position for optimal imaging based on said distance determining step;
   rotating said imaging sensor about at least two different axes to an orientation corresponding to the best CMF plane as determined in the rotating said distancing sensor step;
   optically imaging the object using the imaging sensor.

* * * * *

UNITED STATES PATENT AND TRADEMARK OFFICE
CERTIFICATE OF CORRECTION

PATENT NO. : 6,689,998 B1
DATED : February 10, 2004
INVENTOR(S) : Edward C. Bremer It is certified that error appears in the above-identified patent and that said Letters Patent is hereby corrected as shown below:

Column 1,
Line 13, "depth of field" should read -- depth of field, --.

Column 2,
Line 62, after "an image sensor 18." insert the paragarph
-- The apparatus 10 includes a lens assembly 12, a low f-stop aperture 14, a beam splitter 16, an image sensor 18, a distancing sensor 20, and a movable assembly 22 that form a single integrated assembly that may be mounted in a case 11 shaped either to be mounted as a stationary reader or in a mobile form, e.g., a hand-held form such as a hand-held bar code scanner or CCD reader to be aimed to the object 24. --.

Column 6,
Line 42, "(PAM)" should read -- (RAM) --;
Line 50, "embodimient" should read -- embodiment --;
Line 52, "for," should read -- for --.

Column 7,
Line 7,"twb-dimensional" should read -- two-dimensional --;
Line 30, "FIG. 29" should read -- FIG. 2B --;
Line 62, "distancing sensor 82" should read -- distancing sensor 82. --.

Column 12,
Line 51, "The method of claim 29" should read -- The method of claim 28 --.

Column 13,
Line 56, "defines plane" should read -- defines a plane --.

Signed and Sealed this

Ninth Day of November, 2004

JON W. DUDAS
*Director of the United States Patent and Trademark Office*